United States Patent Office
3,275,657
Patented Sept. 27, 1966

3,275,657
BASIC 1,3-DIOXANES AND THEIR SALTS
Werner Winter and Kurt Stach, Mannheim, and Wolfgang Schaumann, Mannheim-Waldhof, Germany, assignors to C. F. Boehringer & Soehne G.m.b.H., a corporation of Delaware
No Drawing. Filed Sept. 13, 1963, Ser. No. 308,633
Claims priority, application Germany, Sept. 29, 1962, B 69,027
5 Claims. (Cl. 260—340.7)

This invention relates to 1,3-dioxanes, and to methods for obtaining the same. More particularly, this invention relates to new compounds of the formula and includes the non-toxic acid addition salts thereof:

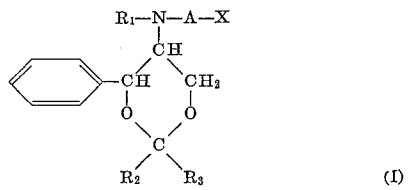

wherein $R_1$ represents hydrogen or lower alkyl, A represents an alkylene radical, X represents a benzohydryl or a 1-phenylcyclohexyl group, and $R_2$ and $R_3$ represent hydrogen, aryl, or alkyl, or, when taken together with the C-2 of the dioxane ring a cycloalkyl group.

The new compounds of the invention are of great therapeutic value. They exert a pronounced vasodilatory effect and are characterized by a high coronary specificity. Thus, in their ability to produce a vasodilation, characterized by their high coronary specificity, these compounds are extremely useful as coronary vasodilators and specifically for the treatment of coronary artery disease, namely to improve myocardial blood flow by direct vasodilation without significantly changing cardiac output, blood pressure, or pulse rate.

The products of the invention can be obtained in the free base form having the formula given above or in the form of one of their acid addition salts with inorganic or organic acid. Some examples of these salts are: hydrochloride, hydrobromide, hydroiodide, sulfate, sulfonate, phosphate, citrate, acetate, and the like.

In accordance with the invention, the new 1,3-dioxanes can be prepared by a number of alternate but equivalent reactions:

(1) Condensation of a halogen compound of the formula X-A-Hal with a 5-aminodioxane-(1,3) of the formula:

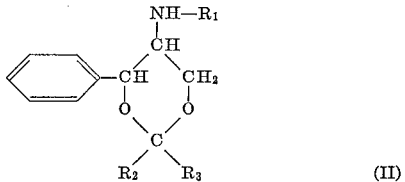

where $R_1$, $R_2$, $R_3$, X and A have the same significance as given above. The reaction is preferably carried out in an inert solvent in the presence of a substance which splits off hydrogen halide such as alkali carbonate or an excess of the aminodioxane. It is also possible to conduct this reaction by condensing a 5-halogen-dioxane of the formula:

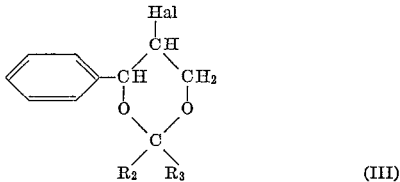

with an amine of the formula $R_1$-NH-A-X where $R_1$, $R_2$, $R_3$, A and X have the same significance as given above. In this instance, it is preferable to conduct the reaction at an elevated temperature and, furthermore, in some instances, at elevated pressures as well.

(2) Reduction of an aldehyde of the general formula:

where X is as given above and B represents an alkylene radical having one carbon atom less than A, and if A has only one carbon atom, B represents a C—C bond, in the presence of an aminodioxane of Formula II where $R_1$ represents hydrogen. The azomethine compounds occurring as intermediates can be isolated and thereafter reduced by the conventional methods. Where it is desired to obtain compounds of Formula I wherein R represents a lower alkyl group, an alkylation reaction must follow.

In place of the aldehyde of Formula IV, ketones corresponding thereto can be used, as for example, methyl ketones of the formula:

wherein X is as defined hereinbefore and B' is an alkylene radical having 2 carbon atoms less than A. Other alkyl ketones can also be advantageously used.

(3) Reduction of an acid amide of the formula:

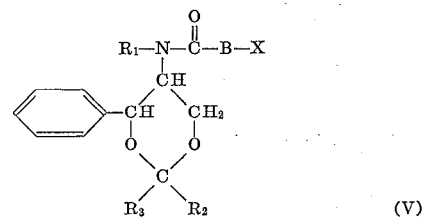

where $R_1$, $R_2$, $R_3$, B, and X have the same significance as given above. The reduction is preferably carried out with lithium aluminum hydride in an appropriate solvent such as, for example, an ether or tetrahydrofuran.

The 5-aminodioxanes of Formula II and the halogen dioxanes of Formula III employed as starting materials are produced as intermediates in a chloramphenicol synthesis known to the art. Their preparation is described in the literature, including the Patent literature, as for example in German Patents 870,857 and 972,617 and in British Patent 741,711. The acid amides of the Formula V are preferably prepared by reacting an aminodioxane of Formula II with an acid halide of the formula

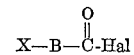

where X and B are as above-defined in an inert solvent such as, for instance, benzene in the presence of a base as, for example pyridine.

The invention is illustrated by the following examples, it being understood that the same are in nowise to be taken as limitative thereof. The optical rotation values given in the examples were determined in methanol (concentration 2%).

EXAMPLE 1

D,L-threo-2,2-dimethyl-4-phenyl-5-(3,3-diphenyl-propylamino)-dioxane-(1,3)

20.7 g. (0.1 mol) D,L-threo-2,2-dimethyl-4-phenyl-5-aminodioxane-(1,3) and 15.1 g. 3,3-diphenyl-1-bromopropane (0.055 mol) are heated for 8 hours at ebullition in 100 cc. of methyl ethyl ketone. A portion of the solvent is then removed by evaporation in vacuo and ether is added to the residue. The hydrobromide is thereby precipitated from the starting material and is removed by filtration. The hydrochloride of D,L-threo-2,2 - dimethyl - 4-phenyl-5-(3,3-diphenyl-propylamino)-dioxane-(1,3) is precipitated out on adding ethereal hydrochloric acid to the filtrate and is recrystallized out of isopropanol. The yield of the hydrochloride salt of D,L - threo-2,2-dimethyl-4-phenyl-5-(3,3-diphenyl-propyl-amino)-dioxane-(1,3) amounts to 15.7 g. (72% of theory) and has a melting point of 198–200° C.

EXAMPLE 2

*L(+)-threo-2,2-dimethyl-4-phenyl-5-(3,3-diphenyl-propylamino)-dioxane-(1,3)*

According to the procedure of Example 1, 20.7 g. L(+) - threo - 2,2 - dimethyl-4-phenyl-5-amino-dioxane-(1,3) ([alpha]$_D^{25}$+51.3°) are reacted with 13.7 g. 3,3-diphenyl-1-bromopropane (0.05 mol) in 100 cc. methyl ethyl ketone. 14.7 g. (67% of theory) of the hydrochloride of L(+)-threo-2,2-dimethyl-4-phenyl-5-(3,3-diphenyl-propylamino)-dioxane-(1,3) having a melting point of 207–209° C. (isopropanol): [alpha]$_D^{22}$+48.6° are obtained.

EXAMPLE 3

*Erythro-2,2-dimethyl-4-phenyl-5-(3,3-diphenyl-propylamino)-dioxane-(1,3)*

20.7 g. erythro-2,2-dimethyl-4-phenyl-5-aminodioxane-(1,3) ([alpha]$_D^{25}$ −2.8°) are reacted with 15.1 g. 1,1-diphenyl-3-bromopropane in 100 cc. acetone according to the process described in Example 1.

12.9 g. (58.9% of theory) of the hydrochloride of erythro - 2,2 - dimethyl-4-phenyl-5-(3,3-diphenyl-propyl-amino) - dioxane - (1,3) having a melting point of 218–219° C. (alcohol); [alpha]$_D^{20}$±0° are isolated from the reaction mixture.

EXAMPLE 4

*L(+)-threo-4-phenyl-5-(3,3-diphenylpropylamino)-dioxane-(1,3)*

17.9 g. (0.1 mol) L-(+)-threo-4-phenyl-5-aminodioxane-(1,3) ([alpha]$_D^{20}$+51.4°) are refluxed with 15.1 g. 3,3-diphenylpropyl-bromide in 100 cc. diethyl ketone for 10 hours. The reaction mixture is then further processed as set out in Example 1. There are obtained 15.2 grams (74% of theory) of the hydrochloride of L(+)-threo-4-phenyl - 5-(3,3-diphenylpropylamino)-dioxane-(1,3) having a melting point of 250–251° C.:[alpha]$_D^{20}$+28.5°.

EXAMPLE 5

*D,L-threo-4-phenyl-5-(3,3-diphenylpropylamino)-dioxane-(1,3)*

15.1 g. (0.084 mol) D,L-threo-4-phenyl-5-aminodioxane-(1,3) and 12.6 grams of 3,3-diphenyl-1-bromopropane (0.046 mol) are heated at ebullition for 10 hours in 100 cc. methyl ethyl ketone and further processed as disclosed in Example 1.

13.1 (76.1% of theory) of the hydrochloride of D,L-threo - 4 - phenyl-5-(3,3-diphenylpropylamino)-dioxane-(1,3) are obtained having a melting point of 248–250° C. (alcohol).

EXAMPLE 6

*D,L-threo-2,2-pentamethylene-4-phenyl-5-(3,3-diphenyl-propylamino)-dioxane-(1,3)*

From a reaction mixture consisting of 24.7 g. (0.1 mol) D,L - threo - 2,2 - pentamethylene-4-phenyl-5-aminodioxane-(1,3) and 15.1 g. 3,3-diphenyl-1-bromopropane, there are obtained by the method described in Example 1, 16.2 g. (67.8% of theory) of the hydrochloride of D,L-threo - 2,2 - pentamethylene - 4 - phenyl-5-(3,3-diphenyl-propylamino)-dioxane-(1,3) having a melting point of 212–214° C. (alcohol).

EXAMPLE 7

*D,L-threo-2,4-diphenyl-5-(3,3-diphenylpropylamino)-dioxane-(1,3)*

15.9 g. (0.062 mol) 2,4-diphenyl-5-amino-dioxane-(1,3) and 9.6 g. (0.035 mol) 3,3-diphenyl-1-bromopropane are reacted as described in Example 1. Following a work up of the reaction mixture, 8.1 g. (52.4% of theory (calculated on ½ mol of water of crystallization)) of the hydrochloride of D,L-threo-2,4-diphenyl-5-(3,3-diphenylpropylamino)-dioxane-(1,3) having a melting point of 175–177° C. are obtained.

EXAMPLE 8

*D,L-threo-2,2-dimethyl-4-phenyl-5-[gamma-(1-phenyl-cyclohexyl)-propylamino]-dioxane-(1,3)*

There is added in dropwise fashion and with agitation at a temperature of 10–15° C. to a solution of 10.35 g. (0.05 mol) D,L-threo - 2,2 - dimethyl-4-phenyl-5-amino-dioxane and 4.7 g. pyridine in 75 cc. benzene, a mixture of 13.7 g. beta-(1-phenylcyclohexyl)-propionic acid chloride and 150 cc. benzene. The resulting mixture is stirred for 2 hours at room temperature and thereafter the mixture is shaken with bicarbonate solution and water. The dried benzene solution is concentrated by evaporation using vacuum, and the concentrate obtained is recrystallized out of petroleum ether. In this manner, 16.3 grams (74.5% of theory) of D,L-threo-2,2-dimethyl-4 - phenyl - 5 - [beta - (1 - phenylcyclohexyl) - propionyl-amino]-dioxane-(1,3) having a melting point of 112° C. are obtained.

15 g. (0.035 mol) of the amide are suspended in 150 cc. absolute ether and added dropwise to a mixture of 2.74 g. (0.072 mol) lithium aluminum hydride and 50 cc. absolute ether. The resulting mixture is boiled for 20 hours and following the addition of a sodium chloride solution, the aqueous phase is extracted with ether. The combined solvent layers are dried and concentrated in vacuo. After treatment with ethereal hydrochloric acid, 9.8 grams (62% of theory) of the hydrochloride of D,L-threo-2,2-dimethyl-4-phenyl-5-[gamma-(1-phenyl-cyclohexyl)-propylamino]-dioxane-(1,3) having a melting point of 176–178° C. (following recrystallization from methyl ethyl ketone) are obtained.

EXAMPLE 9

*D,L-threo-2,2-tetramethylene-4-phenyl-5-[3,3-diphenyl-propylamino]-dioxane-(1,3)*

24.5 g. diphenyl-propionyl chloride in 40 ml. benzene are slowly added to a solution of 23.3 g. (0.1 mol) D,L-threo-2,2-tetramethylene-4-phenyl-5-aminodioxane - (1,3) in 60 ml. benzene and 8.7 g. pyridine and the mixture obtained is stirred for 2 hours at room temperature. After shaking with water and bicarbonate solution, 29 g. of 2,2-tetramethylene-4-phenyl-5-[beta,beta-diphenyl-propionylamino]-dioxane-(1,3) are isolated in the form of a crude product. 22 g. of the unpurified 2,2-tetra-methylene - 4 - phenyl-5-[beta,beta - diphenyl-propionyl-amino]-dioxane-(1,3) (0.05 mol) are reduced as set out in Example 8 using for the reduction 5.7 g. lithium aluminum hydride in 200 ml. ether. The reduction mixture is processed as in Example 8 and 11.8 g. (51% of theory) of D,L-threo-2,2-tetramethylene-4-phenyl-5-[3,3 - diphenylpropylamino]-dioxane-(1,3) in the form of its hydrochloride having a melting point of 200–201° C. (following recrystallization from isopropanol) are obtained.

EXAMPLE 10

*D,L-threo-2,2-dimethyl-4-phenyl-5-[beta,beta-diphenyl-ethylamino]-dioxane-(1,3)*

20 g. (0.05 mol) 2,2-dimethyl-4-phenyl-5-[diphenyl-acetylamino]-dioxane-(1,3) having a melting point of 118–119° C. obtained by reacting 2,2-dimethyl-4-phenyl-5-aminodioxane-(1,3) with diphenylacetyl chloride in a 73.5% yield according to the process of Example 9 are reduced by 30 hours of boiling with 3.8 g. lithium aluminum hydride (0.1 mol) in 200 ml. of ether. The reduction mixture is processed as described in Example 8 and 9.95 grams (47% of theory) of the hydrochloride of D,L-threo-2,2-dimethyl-4-phenyl-5-[beta,beta - diphenylethylamino]-dioxane-(1,3) having a melting point of 199° C. (following recrystallization from isopropanol) are thereby obtained.

EXAMPLE 11

*D,L-threo-2,2-hexamethylene-4-phenyl-5-[3,3-diphenylpropylamino]-dioxane-(1,3)*

10.3 g. (0.025 mol) 2,2-hexamethylene-4-phenyl-5-[beta,beta-diphenylpropionylamino]-dioxane - (1,3), the crude product of the reaction of 2,2-hexamethylene-4-phenyl-5-aminodioxane-(1,3) and diphenylpropionylchloride, according to the procedure of Example 9, are reduced with lithium aluminum hydride in ether according to the process described in Example 8. There are obtained 4.3 grams (35% of theory) of the hydrochloride of D,L-threo - 2,2 - hexamethylene-4-phenyl-5-[3,3-diphenylpropylamino]-dioxane-(1,3) having a melting point of 184–186° C.

EXAMPLE 12

*D,L-threo-4-phenyl-5-[3,3-diphenylpropylamino]-dioxane-(1,3)-2-spiro-4'-methylcyclohexane*

Using the procedure as set out in Example 1, 15.1 grams of diphenylpropylbromide (0.055 mol) are reacted with 26.1 g. 4-phenyl-5-amino-dioxane-(1,3)-2-spiro-4'-methylcyclohexane (0.1 mol) in 100 ml. methyl ethyl ketone and the reaction product further worked up as set out in Example 1. There are obtained 13.75 g. (56% of theory) of the hydrochloride of D,L-threo-4-phenyl-5-[3,3-diphenylpropylamino] - dioxane - (1,3) - 2-spiro-4'-methylcyclohexane having a melting point of 205–207° C. (recrystallized from isopropanol).

EXAMPLE 13

*D,L-threo-2,2-dimethyl-4-phenyl-5-[(3,3-diphenyl-propyl)-methylamino]-dioxane-(1,3)*

10 grams (0.025 mol) D,L-threo-2,2-dimethyl-4-phenyl-5-(3,3-diphenyl - propylamino)-dioxane-(1,3) are N-methylated using the free base (M.P. 89° C.) as a starting material in the following manner: a mixture of 5.5 ml. formalin (40%) and 10 ml. methanol is dripped into a solution of the base dissolved in 30 ml. of methanol. The mixture is stirred for 3 hours at room temperature and allowed to stand overnight. The excess formalin is then removed by vacuum evaporation. The concentrate is redissolved in methanol (30 ml.) and there are added in two portions of 1.9 g. each sodium hydroxide. The resulting mixture is heated to boiling for half an hour and then decomposed with water.

After processing in the usual manner, 10.2 g. of crude base are obtained from which 7.7 g. (68% of theory) of the hydrochloride of D,L-threo-2,2-dimethyl-4-phenyl-5-[(3,3-diphenylpropyl)-methylamino]-dioxane-(1,3) having a melting point of 176–178° C. (recrystallized from acetone) can be recovered.

The basic 1,3-dioxanes of the invention have been found to be highly active as coronary vasodilating agents.

The efficacy of the claimed compounds as coronary vasodilating agents was evaluated using the following test procedures:

(1) Vasodilatory effect on the isolated guinea pig's heart according to Langendorff.

(2) Vasodilatory effect "in situ" on the hind leg of the rabbit.

(3) Blood pressure reducing effect on the rabbit using intravenous injection.

All of the experiments were carried out using Segontin (N-3'-phenyl-propyl-2') - 1,1 - diphenyl-propyl-(3)-amine as the standard. The amounts of Segontin and test substance were determined which produced substantially equal effects in the above procedures. In the first three columns of the table which follows, there is shown the effectiveness of the test substance as a percentage of that of Segontin.

In the experiments the following compounds in accordance with the invention were employed:

A = D,L-threo-2,2-dimethyl-4-phenyl-5-(3,3-diphenylpropylamino)-dioxane-(1,3)
B = L(+)-threo-2,2-dimethyl-4-phenyl-5-(3,3-diphenylpropylamino)-dioxane-(1,3)
C = Erythro-2,2-dimethyl-4-phenyl-5-(3,3-diphenylpropylamino)-dioxane-(1,3)
D = D,L-threo-2,2-pentamethylene-4-phenyl-5-(3,3-diphenyl-propylamino)-dioxane-(1,3)
E = D,L-threo-2,2-dimethyl-4-phenyl-5-[gamma-(1-phenyl-cyclohexyl)-propylamino]-dioxane-(1,3)

TABLE.—VASODILATORY AND BLOOD PRESSURE REDUCING EFFECT IN COMPARISON WITH SEGONTIN

| Compound | Vasodilation | | Blood Pressure | Coronary Specificity | |
|---|---|---|---|---|---|
| | Heart | Leg | | Heart / Leg | Heart / Blood Pressure |
| Segontin | 100 | 100 | 100 | 1.0 | 1.0 |
| A | 100 | 33 | 48 | 3.0 | 2.1 |
| B | 75 | 33 | 25 | 2.3 | 3.0 |
| C | 48 | 40 | 40 | 1.2 | 1.2 |
| D | 63 | 15 | 48 | 4.2 | 1.3 |
| E | 111 | 43 | 56 | 2.6 | 2.0 |

As the novel compounds in accordance with the invention are to be used as coronary vasodilators, the most important factor in evaluating their effectiveness is the ratio existing between the coronary dilating effect and the general vasodilation and blood pressure reduction, i.e. the coronary specificity. In the last two columns of the table above, coronary specificity is computed on the basis of the effectiveness in the heart with respect to that on the circulation of the hind leg and on the blood pressure.

From the table it can be seen that compound E, namely D,L-threo-2,2-dimethyl - 4 - phenyl-5-[gamma(1-phenyl-cyclohexyl) - propylamino] - dioxane - (1,3) exhibits a greater effectiveness in the heart than does the comparison compound indicating that this is superior to Segontin as a coronary dilating agent. An improved coronary specificity is observed for all of the compounds in accordance with the invention. An improvement is achieved when the quotient of coronary dilating effect/general vasodilating effect is greater than 1. In the table all the values have been underscored in which the compounds of the invention are superior and more effective than Segontin.

The new compounds of the invention are employed as medicinal agents in dosage unit form. Dosage units of the compounds in accordance with the invention may be employed as the sole therapeutic agent, or they may be employed in combination with other materials as, for example, a diuretic. Of course, the dosage unit of the novel compounds in accordance with the invention may contain, in addition to the compound of the invention inert materials. For instance, when the dosage unit form is a tablet, pills or granules, there may also be present various binders, fillers, or solid diluents. When the dosage unit form is a capsule, it may contain, in addition to materials of the above type, the liquid carrier. If the compounds in accordance with the invention are employed as injectable materials, conventional liquid carriers may be employed in connection therewith. Of course, any materials used in preparing the dosage unit form must be pharmaceutically pure and substantially non-toxic in the amounts employed.

Typical examples of the groups represented by the designated substituents of Formula I are the following: $R_1$ may be hydrogen or a lower alkyl group, that is methyl, ethyl or propyl. Included in the alkylene group A are methylene, ethylene and propylene as well as isopropylene and isobutylene. The substituents $R_2$ and $R_3$ represent hydrogen or an aryl residue, such as phenyl, or an alkyl residue, such as methyl, or when taken together with the C-2 of the dioxane ring a cycloalkyl group, such as cyclopentyl, cyclohexyl, cycloheptyl or 4-methyl-cyclohexyl.

What is claimed is:

1. A compound of the class consisting of the free base and its acid addition salts, said free base having the formula

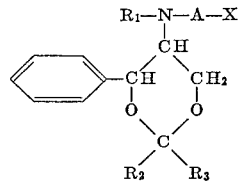

wherein $R_1$ represents a member selected from the group consisting of hydrogen and methyl, A represents an alkylene radical having from 1–3 carbon atoms, X represents benzohydryl and $R_2$ and $R_3$ each represents a member selected from the group consisting of hydrogen, methyl and phenyl and when taken together with the 2–C atom of the dioxane ring a cycloalkyl group of 5–7 carbon atoms, with the proviso that only one of $R_2$ and $R_3$ is phenyl and $R_1$ is methyl when $R_2$ and $R_3$ represent dissimilar members selected from the group consisting of methyl and phenyl.

2. D,L-threo-2,2-dimethyl - 4 - phenyl-5-(3,3-diphenyl-propylamino)-dioxane-(1,3).

3. L(+)-threo-2,2-dimethyl - 4 - phenyl-5-(3,3-diphenyl-propylamino)-dioxane-(1,3).

4. Erythro - 2,2 - dimethyl - 4 - phenyl-5-(3,3-diphenyl-propylamino)-dioxane-(1,3).

5. D,L-threo-2,2-pentamethylene - 4 - phenyl-5-(3,3-diphenyl-propylamino)-dioxane-(1,3).

No references cited.

WALTER A. MODANCE, *Primary Examiner.*

D. M. KERR, NORMA S. MILESTONE, *Assistant Examiners.*

UNITED STATES PATENT OFFICE
CERTIFICATE OF CORRECTION

Patent No. 3,275,657　　　　　　　　　　　　　　September 27, 1966

Werner Winter et al.

It is hereby certified that error appears in the above numbered patent requiring correction and that the said Letters Patent should read as corrected below.

In the heading to the printed specification, lines 5 and for "a corporation of Delaware" read -- a corporation of Germa --; column 6, in the table, fifth and sixth columns, line 1 thereof, for "1.0", each occurrence, read -- 1.0 --.

Signed and sealed this 29th day of August 1967.

(SEAL)
Attest:

ERNEST W. SWIDER　　　　　　　　　　　　　　EDWARD J. BRENNER
Attesting Officer　　　　　　　　　　　　　　Commissioner of Patents